United States Patent
Zhang

(10) Patent No.: US 7,584,306 B2
(45) Date of Patent: Sep. 1, 2009

(54) KVM SWITCH WITH ON-SCREEN-DISPLAY AND A COMPUTER SWITCHING METHOD THEREOF

(75) Inventor: Jin-Yu Zhang, Taipei Hsien (TW)

(73) Assignee: ATEN International Co., Ltd., Hsichih (TW)

( * ) Notice: Subject to any disclaimer, the term of this patent is extended or adjusted under 35 U.S.C. 154(b) by 394 days.

(21) Appl. No.: 11/132,580

(22) Filed: May 19, 2005

(65) Prior Publication Data

US 2006/0262138 A1 Nov. 23, 2006

(51) Int. Cl.
*G09G 5/00* (2006.01)
(52) U.S. Cl. .................. 710/5; 710/65; 345/629
(58) Field of Classification Search .................. 710/62, 710/301, 305; 345/629, 168, 156; 709/253; 715/810
See application file for complete search history.

(56) References Cited

U.S. PATENT DOCUMENTS

| | | | |
|---|---|---|---|
| 5,721,842 A * | 2/1998 | Beasley et al. | 709/204 |
| 5,721,843 A | 2/1998 | Ganti et al. | |
| 5,884,096 A * | 3/1999 | Beasley et al. | 710/38 |
| 5,937,176 A | 8/1999 | Beasley et al. | |
| 6,112,264 A | 8/2000 | Beasley et al. | |
| 6,345,323 B1 | 2/2002 | Beasley et al. | |
| 6,388,658 B1 * | 5/2002 | Ahern et al. | 345/168 |
| 6,557,170 B1 * | 4/2003 | Wilder et al. | 725/130 |
| 6,671,756 B1 * | 12/2003 | Thomas et al. | 710/73 |
| 6,718,415 B1 * | 4/2004 | Chu | 710/301 |
| 7,472,217 B2 * | 12/2008 | Lou et al. | 710/316 |
| 2002/0097220 A1 * | 7/2002 | Ferguson et al. | 345/156 |
| 2003/0126337 A1 * | 7/2003 | Ferguson et al. | 710/305 |
| 2003/0200345 A1 * | 10/2003 | Ramsey et al. | 709/253 |
| 2003/0227490 A1 * | 12/2003 | Kim | 345/810 |
| 2005/0172039 A1 * | 8/2005 | Hsu | 710/1 |
| 2006/0262138 A1 * | 11/2006 | Zhang | 345/629 |
| 2007/0079348 A1 * | 4/2007 | King et al. | 725/117 |
| 2007/0150818 A1 * | 6/2007 | Liu | 715/740 |
| 2008/0184320 A1 * | 7/2008 | Lou | 725/98 |

FOREIGN PATENT DOCUMENTS

TW 578084 3/2004

OTHER PUBLICATIONS

Office Action by Taiwan Intellectual Property Office in counterpart Taiwan Application No. 095116620, dated Sep. 19, 2008.

* cited by examiner

*Primary Examiner*—Henry W. H. Tsai
*Assistant Examiner*—Cheng-Yuan Tseng
(74) *Attorney, Agent, or Firm*—Chen Yoshimura LLP

(57) ABSTRACT

An input signal from a set of user interface devices is captured, and the input signal is converted into a packet by a console processor. The packet is transferred to a remote processor, and the remote processor generates an update command according to the packet. The update command is transferred to the console processor, and an OSD image is generated according to the update command. The OSD image is overlapped onto a video signal from the computers, and the overlapped video signal is output to the set of the user interface devices.

12 Claims, 6 Drawing Sheets

KVM SWITCH WITH ON-SCREEN-DISPLAY AND A COMPUTER SWITCHING METHOD THEREOF

BACKGROUND

1. Field of Invention

The present invention relates to a KVM switch. More particularly, the present invention relates to a KVM switch operated as a terminal system.

2. Description of Related Art

With the rapid development in information technology, computers and their peripherals have become very popular. Typically, each computer is equipped with one set of user interface devices, and may including a keyboard, a mouse and a monitor. However, this equipment wastes money and occupies too much space if one has several computers. Therefore, a keyboard-video-mouse (KVM) switch is proposed to use at least one set of user interface devices to manage several computers and their peripherals. Using the KVM switch reduces hardware costs and decreases waste of space while simultaneously conquering the problem of compatibility between different interfaces.

FIG. 1 is a schematic view depicting a traditional KVM switch. Each of computers 114 is connected to a switching device 102 through its respective I/O module 104, and each of sets of user interface devices 116 is connected to the switching device 102 through its respective console module 106. The switching device 102 routes paths between the computers 114 and the sets of user interface devices 116. In some practical applications, the switching device 102, the I/O modules 104 and the computers 114 are located in a data center (dash region), which may be far from the console modules 106 and the sets of user interface devices 116 located in other rooms.

The examples of the switching device 102 include KM0432 manufactured by ATEN International Co., LTD.; the examples of the console module 106 include ATEN KA 9270 and KA 9220; and the examples of the I/O module 104 include ATEN KA 9120, KA 9130, KA 9131 and KA 9170.

In the traditional configuration, when one console module 106 receives an OSD (On Screen Display) instruction input from a keyboard or a mouse of its respective set of user interface devices 116, such as a keyboard signal or a mouse signal, the console module 106 typically processes the OSD instruction to generate an OSD image on its own. More particularly, the OSD image is generated based on a new display content update by a console processor of the console module 106 itself, without processing from either the switching device 102 or the I/O modules 104. The console module 106 captures the OSD instruction, decides what should be displayed, and then overlaps the OSD image on the original video signal.

However, the traditional configuration of the KVM switch seems to give a limited system, in which all necessary information possibly used in the OSD image must have been saved before deciding what is to be displayed, and thus the traditional configuration limits the functions and reduces the compatibility of the console module 106. Moreover, if the necessary information is too large to be saved in one console module 106, some memory management techniques may be applied or expensive memories may be added, incurring added costs and design difficulty. In addition, if the firmware needs to be upgraded, every console module 106 has to be individually upgraded because each responds only to its own OSD, and the upgrade procedure certainly takes time and waste effort.

SUMMARY

It is therefore an aspect of the present invention to provide a KVM switch, which decreases the cost and increases the compatibility of the console modules thereof.

According to one preferred embodiment of the present invention, the KVM switch comprises a switching device and at least one console module, and is provided for a set of user interface devices to share a plurality of computers. The switching device has a remote processor and routes paths between the set of user interface devices and the computers. The console module is electrically connected between the switching device and the set of user interface device. The console module has an input circuit, a console processor, an OSD generator and an overlap circuit.

The input circuit receives an input signal from the set of user interface device. The console processor converts the input signal into a packet and transfers the packet to the remote processor, and the remote processor generates an update command according to the packet. The OSD generator generates an OSD image according to the update command. The overlap circuit overlaps the OSD image onto a video signal from the computers and outputs the overlapped video signal to the set of user interface device.

According to another preferred embodiment of the present invention, the KVM switch comprises a switching device and at least one console module, and is provided for a set of user interface devices to share a plurality of computers. The switching device has a remote processor and an overlap circuit, and routes paths between the set of user interface devices and the computers. The console module is electrically connected between the switching device and the set of user interface devices. The console module has an input circuit and a console processor.

The input circuit receives an input signal from the set of user interface devices. The console processor converts the input signal into a packet and transfers the packet to the remote processor, and the remote processor generates an OSD image according to the packet. The overlap circuit overlaps the OSD image onto a video signal from the computers and outputs the overlapped video signal to the set of user interface devices.

It is another aspect of the present invention to provide a computer switching method, which operates a KVM switch as a terminal system, for reducing the design difficulty and saving time and effort necessary for upgrading the KVM switch.

According to one preferred embodiment of the present invention, the method is provided for a set of user interface devices to share a plurality of computers through a switching device. An input signal from the set of user interface devices is captured, and the input signal is converted into a packet by a console processor. The packet is transferred to a remote processor, and the remote processor generates an update command according to the packet. The update command is transferred to the console processor, and an OSD image is generated according to the update command. The OSD image is overlapped onto a video signal from the computers by the switching device, and the overlapped video signal is output to the set of the user interface device.

According to another preferred embodiment of the present invention, the method is provided for a set of user interface devices to share a plurality of computers. An input signal from the set of user interface devices is captured, and the input signal is converted into a packet by a console processor. The packet is transferred to a remote processor, and the remote processor generates an OSD image according to the packet.

The OSD image is overlapped onto a video signal from the computers, and the overlapped video signal is output to the set of the user interface device.

It is still another aspect of the present invention to provide a computer switching method, of which most processing of the OSD image relies on a remote processor rather than a console processor, to expand the functions and to enhance the compatibility of the console module.

According to another preferred embodiment of the present invention, the method is provided for a set of user interface devices to share a plurality of computers. An input signal from the set of user interface devices is captured, and the input signal is converted into a packet by a console processor. The packet is transferred to a remote processor, and the remote processor generates an update command according to the packet.

The update command is transferred to the console processor, and content for an OSD image stored in a display memory is updated according to the update command by the console processor. An OSD image based on the updated content is generated by an OSD generator. The OSD image is overlapped onto a video signal from the computers by an overlap circuit. The overlapped video signal is output to the set of the user interface device.

Accordingly, the cost of the console module can be decreased because it omits a very fast processor and many expensive memories. The design difficulty of the console module can also be reduced due to not requiring complicated memory management techniques. Moreover, the upgrade procedure, which is applied only to the switching device, is simplified, and thus time and effort for upgrading the KVM switch are substantially saved.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
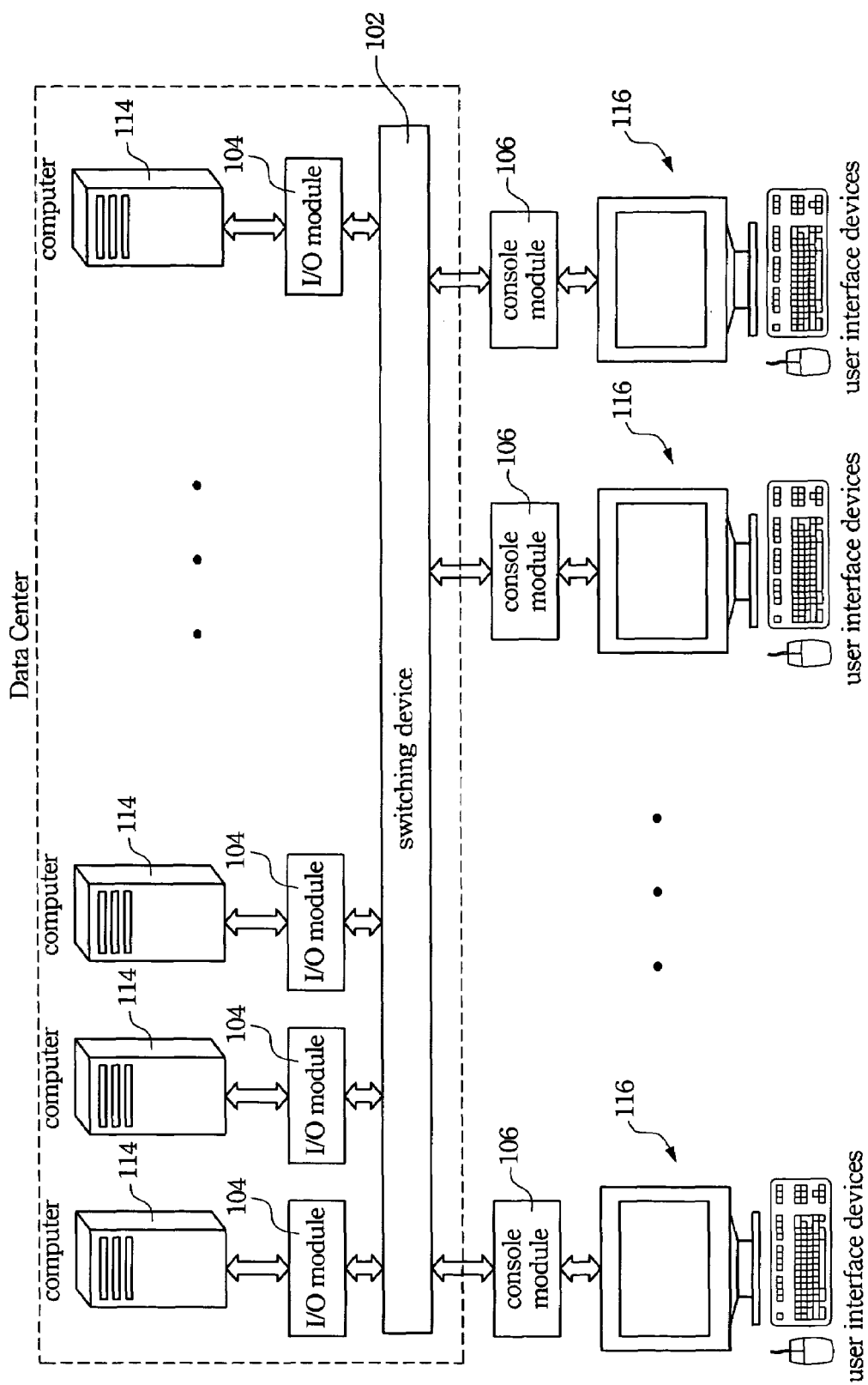
FIG. 1 is a schematic view depicting a traditional KVM switch.

Reference will now be made in detail to the present preferred embodiments of the invention, examples of which are illustrated in the accompanying drawings. Wherever possible, the same reference numbers are used in the drawings and the description to refer to the same or like parts.

The present invention operates a KVM switch as a terminal system. The terminal system relies on a remote processor instead of a console processor for processing content of an OSD image, and thus decreases the cost and increases the compatibility of the console modules. The design difficulty is also reduced, and time and efforts for upgrading the KVM switch are saved.

Figure 2A:
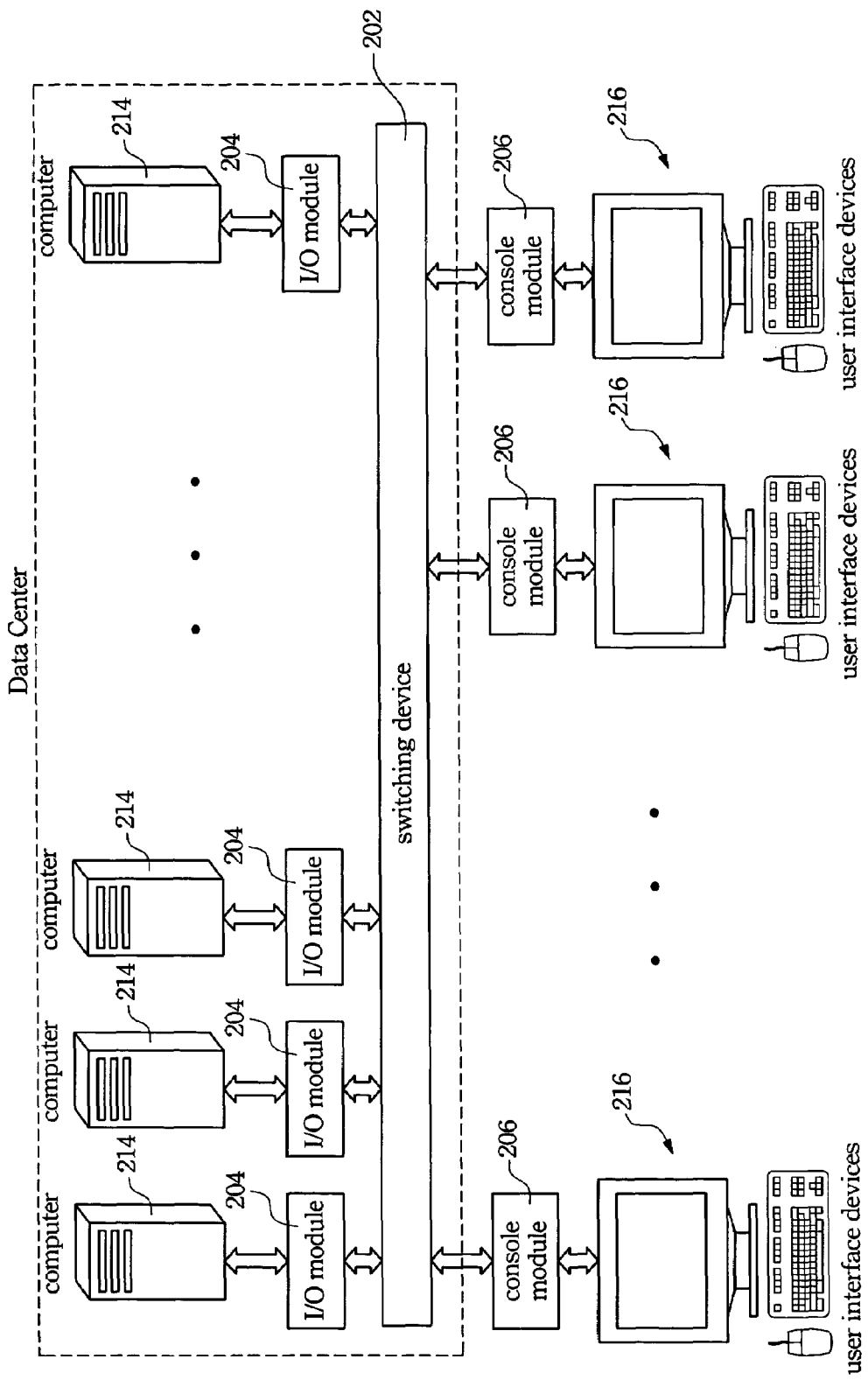
FIG. 2A is a schematic view depicting a KVM switch of one preferred embodiment of the present invention.

FIG. 2A is a schematic view depicting a KVM switch of one preferred embodiment of the present invention, for illustrating connections between the KVM switch, computers, and sets of user interface devices. Each of the computers 214 is connected to a switching device 202 through a respective I/O module 204 thereof, and each of sets of user interface devices 216 is connected to the switching device 202 through a respective console module 206 thereof. The switching device 202 routes paths between the computers 214 and the sets of user interface devices 216. In the preferred embodiment, the switching device 202, the I/O modules 204 and the computers 214 are located in a data center (dash region), which is far from the console modules 206 and the sets of user interface devices 216 located in other rooms.

Figure 2B:
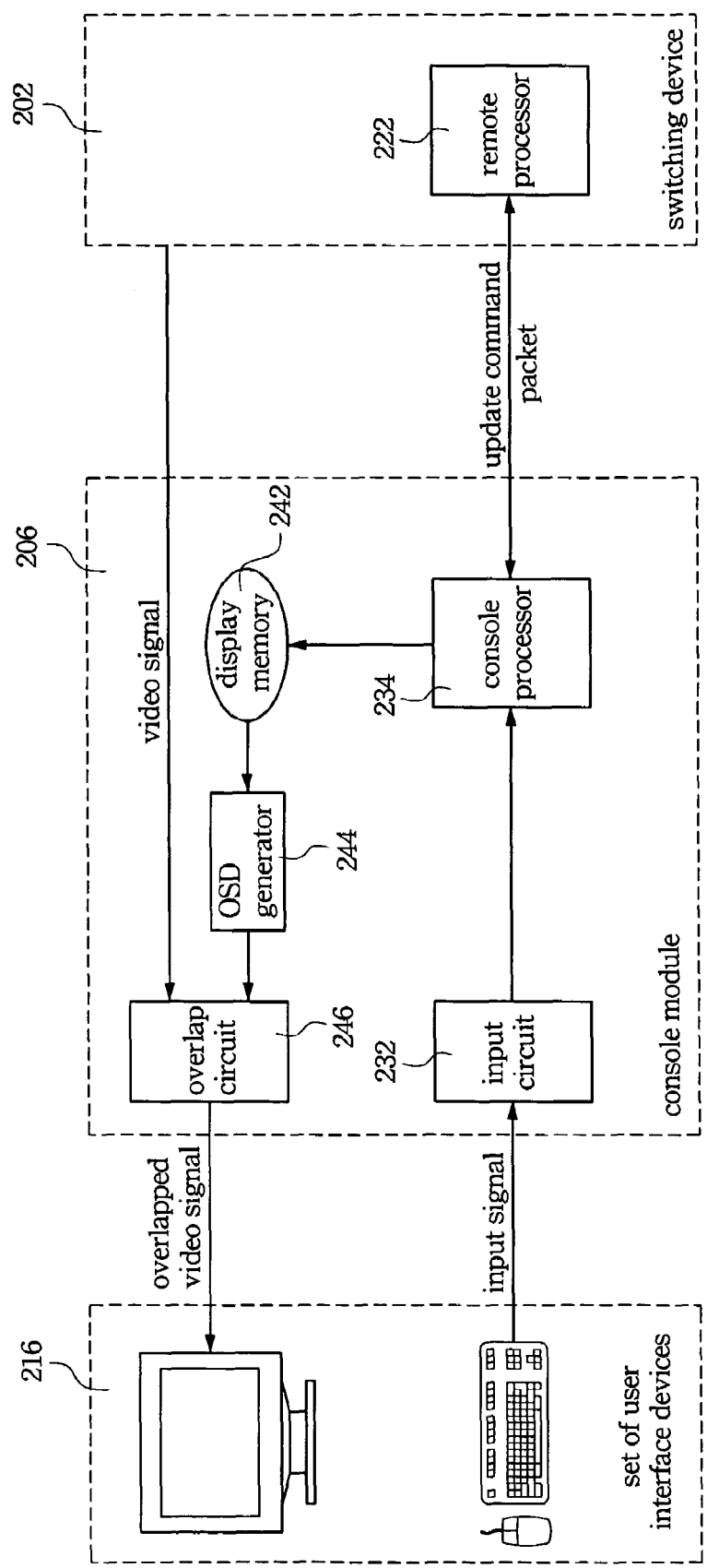
FIG. 2B is a schematic view of one preferred embodiment for illustrating the console module and the switching device in FIG. 2A in detail.

FIG. 2B is a schematic view of one preferred embodiment, for illustrating the console module 206 and the switching device 202 in FIG. 2A, in detail. The switching device 202 has a remote processor 222 and routes paths between the set of user interface devices 216 and the computers 214 (as illustrated in FIG. 2A). The console module 206 is electrically connected between the switching device 202 and the set of user interface devices 216. The console module 206 has an input circuit 232, a console processor 234, an OSD generator 244 and an overlap circuit 246.

The input circuit 232 receives an input signal from the set of user interface devices 216. The console processor 234 converts the input signal into a packet and transfers the packet to the remote processor 222, and the remote processor 222 generates an update command according to the packet. The OSD generator 244 generates an OSD image according to the update command. The overlap circuit 246 overlaps the OSD image onto a video signal from the computers 214 and outputs the overlapped video signal to the set of user interface devices 216.

In the preferred embodiment, the input signal captured from the set of user interface devices 216 is, for example, a keyboard signal or a mouse signal. The console module 206 is electrically connected to the switching device 202 through a CAT5 cable or a wireless connection. In other words, the packet and the update command can be transferred through the CAT5 cable or the wireless connection.

More particularly, the remote processor 222 controls an OSD running status of the KVM switch, which includes necessary information possibly used in the OSD image. The update command is generated based on the OSD running status. That is, the preferred embodiment uses the remote processor 222 instead of the console processor 234 for processing content of the OSD image, and thus the KVM switch is operated as a terminal system.

In addition, the console module 206 further comprises a display memory 242. The display memory 242 stores content prepared for the OSD image. The console processor 234 updates the content according to the update command, and the OSD generator 244 generates the OSD image based on the updated content provided from the display memory 242.

Figure 3:
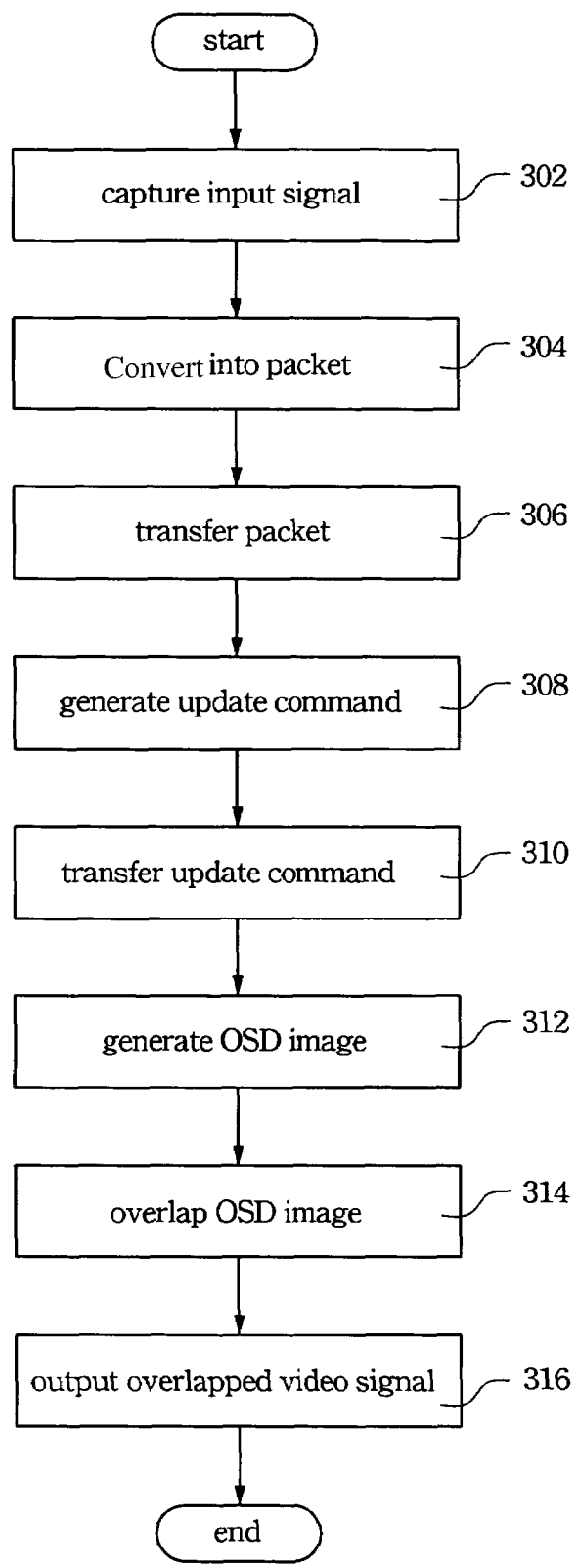
FIG. 3 is a flow chart of one preferred embodiment of the present invention.

FIG. 3 is a flow chart of one preferred embodiment of the present invention for interpreting the method of the present invention. The following descriptions make reference to FIGS. 2A and 2B. The computer switching method is provided for a set of user interface devices 216 to share a plurality of computers 214, and especially via a KVM switch. An input signal from the set of user interface devices 216 is captured (step 302) by, for example, the input circuit 232, and the input signal is converted into a packet by a console processor 234 (step 304). The packet is transferred to a remote processor 222 (step 306), and the remote processor 222 generates an update command according to the packet (step 308).

The update command is transferred to the console processor 234 (step 310), and an OSD image is generated according to the update command (step 312). The OSD image is overlapped onto a video signal from the computers 214 (step 314) by, for example, the overlap circuit 246. The overlapped video signal is output to the set of the user interface devices 216 (step 316).

In this preferred embodiment, the input signal captured from the set of user interface devices 216 may be a keyboard signal or a mouse signal. The packet as well as the update command can be transferred through a CAT5 cable or a wireless connection.

More particularly, content prepared for the OSD image (e.g. stored in the display memory 242) is updated according to the update command by the console processor 234. The OSD image is then generated, based on the updated content, by the OSD generator 244.

In addition, the remote processor 222 controls an OSD running status of the KVM switch, which includes necessary information possibly used in the OSD image, and the update command is generated based on the OSD running status. That is, the preferred embodiment uses the remote processor 222 instead of the console processor 234 for processing content of the OSD image, and thus the KVM switch is operated as a terminal system.

In other words, a kind of new terminal setting (i.e. the formats of the packet and the update command) used between the console (i.e. the console processor 234) and the server (i.e. the remote processor 222) is adopted to achieve the above-mentioned function. This configuration makes the KVM switch operate as a terminal system, of which the input and output procedures are performed by one part and the process procedures are performed by another part. As long as the both parts of the terminal system follow the same terminal setting, they communicate well with each other, regardless of the objects on the two parts.

Besides the foregoing embodiment, another embodiment, in which an OSD image is generated in the switching device instead of in the console module, is also provided as followed.

Figure 4:
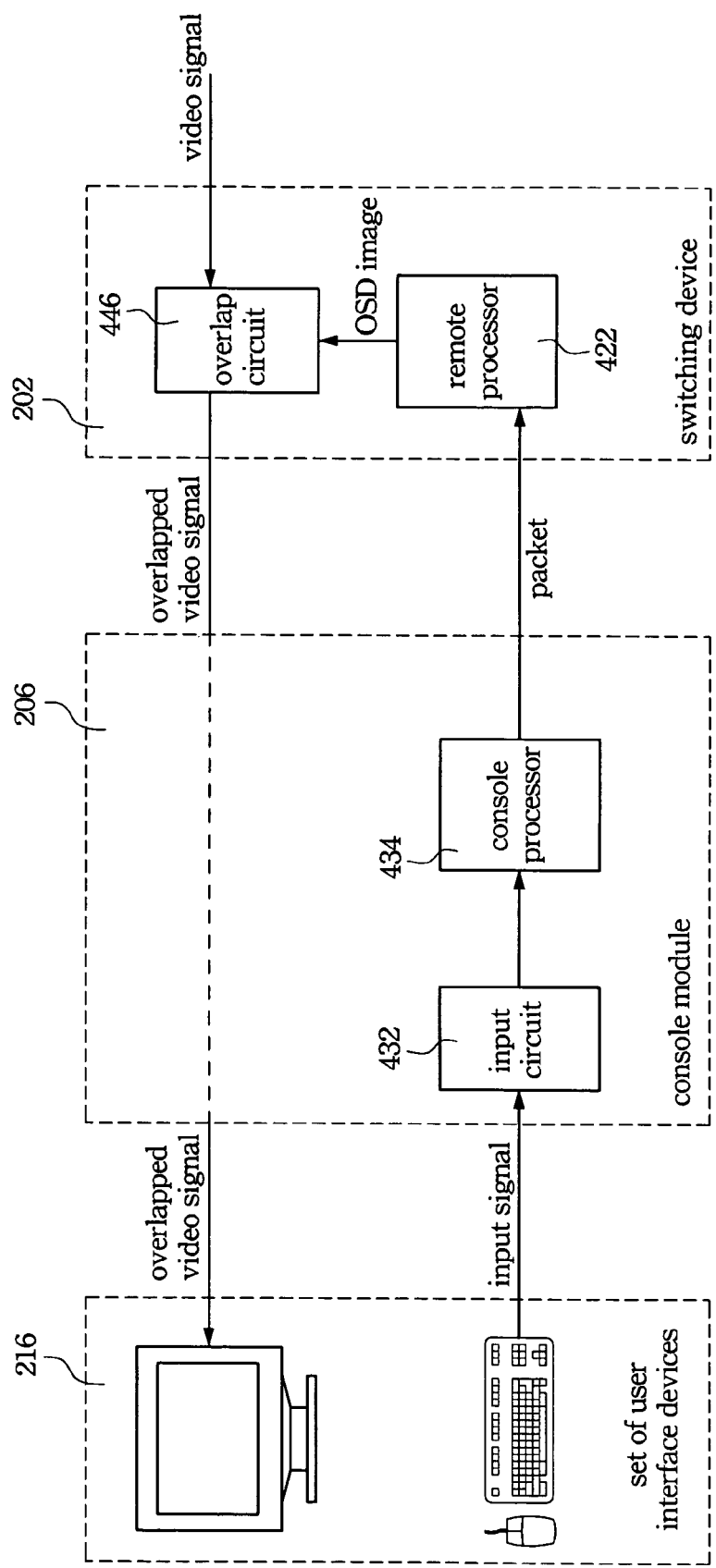
FIG. 4 is a schematic view of another preferred embodiment for illustrating the console module and the switching device in FIG. 2A in detail.

FIG. 4 is a schematic view of another preferred embodiment, for illustrating the console module 206 and the switching device 202 in FIG. 2A, in detail. The switching device 202 has a remote processor 422 and an overlap circuit 446, and routes paths between the set of user interface devices 216 and the computers 214 (as illustrated in FIG. 2A). The console module 206 is electrically connected between the switching device 202 and the set of user interface devices 216. The console module 206 has an input circuit 432 and a console processor 434.

The input circuit 432 receives an input signal from the set of user interface devices 216. The console processor 434 converts the input signal into a packet and transfers the packet to the remote processor 422, and the remote processor 422 generates an OSD image according to the packet. The overlap circuit 446 overlaps the OSD image onto a video signal from the computers 214 and outputs the overlapped video signal to the set of user interface devices 216 via the console module 206.

In the preferred embodiment, the input signal captured from the set of user interface devices 216 is, for example, a keyboard signal or a mouse signal. The console module 206 is electrically connected to the switching device 202 through a CAT5 cable or a wireless connection. In other words, the packet and the OSD image can be transferred through the CAT5 cable or the wireless connection.

More particularly, the remote processor 422 controls an OSD running status of the KVM switch, which includes necessary information possibly used in the OSD image. The OSD image is generated based on the OSD running status. Instead of the console processor 234 or the OSD generator 244 as illustrated in FIG. 2B, the preferred embodiment uses the remote processor 422 to process the OSD image, and thus the KVM switch is also operated as a terminal system.

Figure 5:
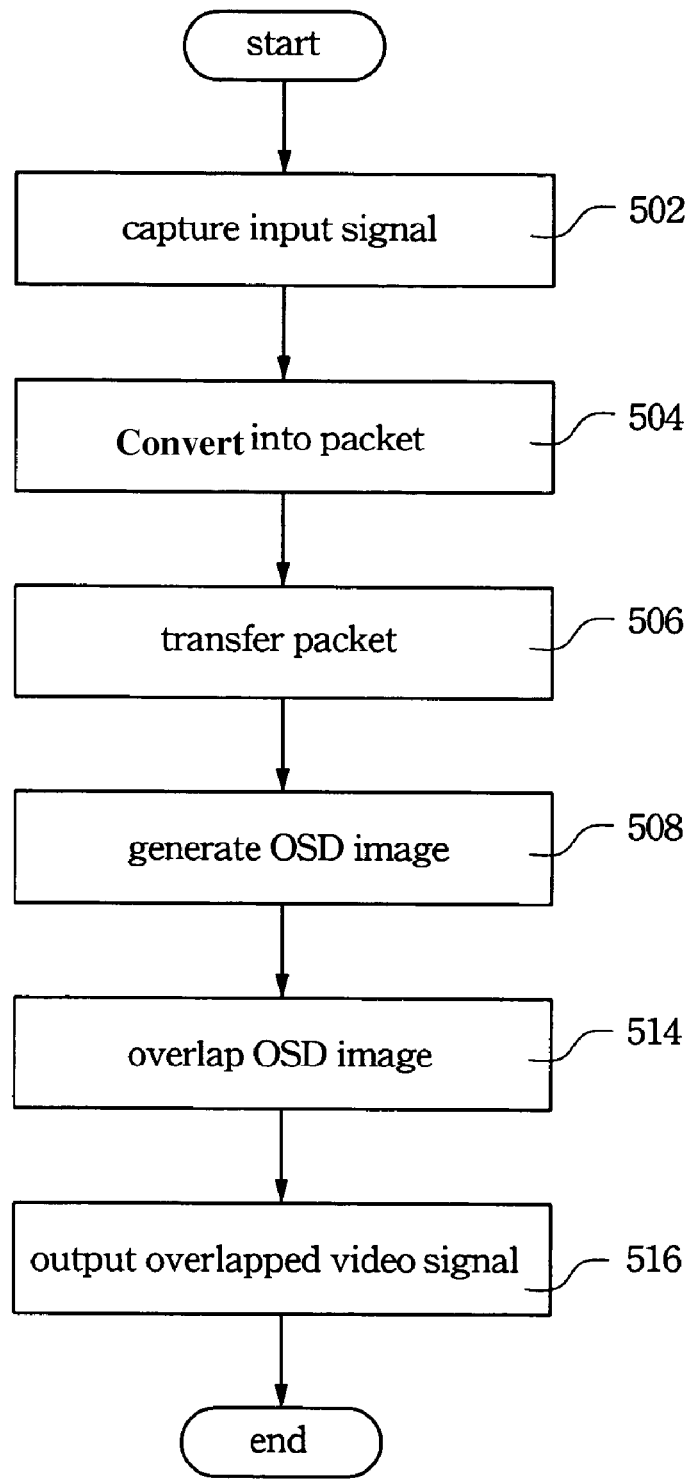
FIG. 5 is a flow chart of another preferred embodiment of the present invention.

FIG. 5 is a flow chart of another preferred embodiment of the present invention for interpreting the method of the present invention. The following descriptions make reference to FIGS. 2A and 4. The computer switching method is provided for a set of user interface devices 216 to share a plurality of computers 214, and especially via a switching device such as a KVM switch. An input signal from the set of user interface devices 216 is captured (step 502) by, for example, the input circuit 432, and the input signal is converted into a packet by a console processor 434 (step 504). The packet is transferred to a remote processor 422 (step 506), and the remote processor 422 generates an OSD image according to the packet (step 508).

The OSD image is overlapped onto a video signal from the computers 214 (step 514) by, for example, the overlap circuit 446 in the switching device 202. The overlapped video signal is output to the set of the user interface devices 216 (step 516).

In this preferred embodiment, the input signal captured from the set of user interface devices 216 may be a keyboard signal or a mouse signal. The packet as well as the OSD image can be transferred through a CAT5 cable or a wireless connection.

In addition, the remote processor 422 controls an OSD running status of the KVM switch, which includes necessary information possibly used in the OSD image, and the OSD image is generated based on the OSD running status. That is, the preferred embodiment uses the remote processor 422 instead of the console processor 434 for processing the OSD image, and thus the KVM switch is operated as a terminal system.

In other words, a kind of new terminal setting (i.e. the formats of the packet) used between the console (i.e. the console processor 434) and the server (i.e. the remote processor 422) is adopted to achieve the above-mentioned function. This configuration makes the KVM switch operate as a terminal system, of which the input and output procedures are performed by one part and the process procedures are performed by another part. As long as the both parts of the terminal system follow the same terminal setting, they communicate well with each other, regardless of the objects on the two parts.

In conclusion, the cost of the console module 206 can be decreased because it omits a very fast processor and many expensive memories. The design difficulty of the console module 206 can also be reduced due to not requiring complicated memory management techniques. Moreover, the upgrade procedure, which is applied only to the switching device 202, is simplified, thus saving time and effort for upgrading the KVM switch.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A KVM switch, for a set of user interface devices to share a plurality of computers, the KVM switch comprising:
   a switching device, arranged to route paths between the set of user interface devices and the computers, wherein the switching device has a remote processor; and
   at least one console module, electrically connected between the switching device and the set of user interface devices, the console module comprising:
      an input circuit, arranged to receive an input signal from the set of user interface devices, wherein the input signal represents information for controlling an On Screen Display (OSD);
      a console processor, arranged to convert the input signal received from the input circuit into an OSD information packet which represents information for controlling the OSD and transfer the OSD information packet to the remote processor, wherein the remote processor is arranged to control an OSD running status of the KVM switch and to generate an OSD update command according to the OSD running status and the OSD information packet which has been received from the console processor, the OSD update command being a command for updating the OSD;
      a display memory, arranged to store content for an OSD image, wherein the console processor is arranged to update the content according to the OSD update command received from the remote processor;
      an OSD generator, arranged to generate an On Screen Display (OSD) image based on the updated content provided from the display memory; and
      an overlap circuit, arranged to overlap the OSD image onto a video signal from the computers and output the overlapped video signal to the set of user interface devices.

2. The KVM switch of claim 1, wherein the input signal is a keyboard signal or a mouse signal.

3. The KVM switch of claim 1, wherein the console module is electrically connected to the switching device through a CAT5 cable or a wireless connection.

4. A computer switching method for a set of user interface devices to share a plurality of computers, the method comprising:
   capturing an input signal from the set of user interface devices, wherein the input signal represents information for controlling an On Screen Display (OSD);
   converting the input signal into an OSD information packet by a console processor, wherein the OSD information packet represents information for controlling the OSD;
   transferring the OSD information packet to a remote processor;
   controlling an OSD running status and generating an OSD update command according to the OSD running status and the OSD information packet by the remote processor, the OSD update command being a command for updating the OSD;
   transferring the OSD update command to the console processor;
   updating content for an On Screen Display (OSD) image stored in a display memory according to the OSD update command by the console processor;
   generating the OSD image based on the updated content by an OSD generator;
   overlapping the OSD image onto a video signal from the computers by an overlap circuit; and
   outputting the overlapped video signal to the set of the user interface devices.

5. The method of claim 4, wherein the input signal is a keyboard signal or a mouse signal.

6. The method of claim 4, wherein the packet and the update command are transferred through a CAT5 cable or a wireless connection.

7. A KVM switch, for a set of user interface devices to share a plurality of computers, the KVM switch comprising:
   a switching device, arranged to route paths between the set of user interface devices and the computers, the switching device comprising:
      a remote processor arranged to generate an On Screen Display (OSD) image; and
      an overlap circuit, arranged to overlap the OSD image onto a video signal from the computers and output the overlapped video signal to the set of user interface devices; and
   at least one console module, electrically connected between the switching device and the set of user interface devices, the console module comprising:
      an input circuit, arranged to receive an input signal from the set of user interface devices, wherein the input signal represents information for controlling an On Screen Display (OSD); and
      a console processor, arranged to convert the input signal received from the input circuit into an OSD information packet which represents information for controlling the OSD and transfer the OSD information packet to the remote processor, wherein the remote processor receives the OSD information packet, controls an OSD running status of the KVM switch, and generates the OSD image according to the OSD running status and the OSD information packet.

8. The KVM switch of claim 7, wherein the input signal is a keyboard signal or a mouse signal.

9. The KVM switch of claim 7, wherein the console module is electrically connected to the switching device through a CAT5 cable or a wireless connection.

10. A computer switching method for a set of user interface devices to share a plurality of computers through a switching device, the method comprising:
    capturing an input signal from the set of user interface device, wherein the input signal represents information for controlling an On Screen Display (OSD);
    converting the input signal into an OSD information packet by a console processor, wherein the OSD information packet represents information for controlling the OSD;
    transferring the OSD information packet to a remote processor in the switching device;
    controlling an OSD running status and generating an On Screen Display (OSD) image according to the OSD running status and the OSD information packet by the remote processor;
    overlapping the OSD image onto a video signal from the computers by the switching device; and
    outputting the overlapped video signal to the set of the user interface devices.

11. The method of claim 10, wherein the input signal is a keyboard signal or a mouse signal.

12. The method of claim 10, wherein the packet is transferred to the remote processor through a CAT5 cable or a wireless connection.

* * * * *

UNITED STATES PATENT AND TRADEMARK OFFICE
CERTIFICATE OF CORRECTION

PATENT NO. : 7,584,306 B2  
APPLICATION NO. : 11/132580  
DATED : September 1, 2009  
INVENTOR(S) : Jin-Yu Zhang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Fourteenth Day of September, 2010

David J. Kappos
*Director of the United States Patent and Trademark Office*